(12) United States Patent
Yang et al.

(10) Patent No.: US 10,315,599 B2
(45) Date of Patent: Jun. 11, 2019

(54) PROTECTION BAR FOR A FRONT OF VEHICLE

(71) Applicant: WINBO-Dongjian Automotive Technology Co.,Ltd., Foshan, Guangdong Province (CN)

(72) Inventors: Jie Yang, Foshan (CN); Weiting He, Foshan (CN); Guowei Lin, Foshan (CN); Yongbo Chen, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 15/791,416

(22) Filed: Oct. 24, 2017

(65) Prior Publication Data

US 2019/0039543 A1    Feb. 7, 2019

(30) Foreign Application Priority Data

Aug. 7, 2017    (CN) .......................... 2017 1 0669019

(51) Int. Cl.
| | | |
|---|---|---|
| B60R 19/50 | (2006.01) | |
| B60R 19/52 | (2006.01) | |
| B60Q 1/18 | (2006.01) | |

(52) U.S. Cl.
CPC ............... B60R 19/52 (2013.01); B60Q 1/18 (2013.01); B60R 19/50 (2013.01); *B60R 2019/505* (2013.01); *B60R 2019/522* (2013.01)

(58) Field of Classification Search
CPC ... B60R 19/50; B60R 19/52; B60R 2019/522; B60R 2019/525; B60R 2019/505; B60Q 1/18

USPC ........ 293/115, 117, 142–144, 146, 151, 152, 293/155

See application file for complete search history.

(56) References Cited

U.S. PATENT DOCUMENTS

| | | | | |
|---|---|---|---|---|
| 4,671,552 A * | 6/1987 | Anderson | ............... | B60R 19/50 293/144 |
| 5,215,343 A * | 6/1993 | Fortune | ................... | B60R 19/52 293/115 |
| 5,695,228 A * | 12/1997 | Storer | ..................... | B60R 19/52 29/460 |
| 5,896,946 A * | 4/1999 | Brackett | ............... | B60P 3/1066 182/127 |
| 6,113,164 A * | 9/2000 | Setina | ..................... | B60R 19/54 293/115 |
| 6,290,271 B1 * | 9/2001 | Geisler | ................... | B60R 19/52 293/115 |
| 6,315,338 B1 * | 11/2001 | Schneider | ............... | B60R 19/52 180/68.6 |
| 6,685,244 B2 * | 2/2004 | McCoy | .................. | B60D 1/485 293/102 |

(Continued)

*Primary Examiner* — Gregory A Blankenship

(57) ABSTRACT

The present disclosure provides a protection bar for a front of vehicle, comprising: two vertical portions, connected to the front of vehicle wherein a distance is defined between the two vertical portions, the distance is variable according to different positions of the two vertical portions; a first horizontal portion comprising a plurality of first walls to define a first chamber, wherein the first horizontal portion is detachably assembled on the two vertical portions by two first connection components each connecting a respective first wall of the first horizontal portion and a corresponding one of the two vertical portions.

15 Claims, 3 Drawing Sheets

(56) References Cited

U.S. PATENT DOCUMENTS

| | | | | |
|---|---|---|---|---|
| 6,925,735 B2* | 8/2005 | Hamm | ............... | B62D 49/04 |
| | | | | 172/811 |
| 6,979,016 B1* | 12/2005 | Wegener | ............... | B60D 1/56 |
| | | | | 280/495 |
| 7,121,596 B2* | 10/2006 | Rood | ............... | B60R 19/48 |
| | | | | 293/115 |
| 7,344,120 B2* | 3/2008 | McFarland | ............ | B66D 1/00 |
| | | | | 224/511 |
| 2006/0201980 A1* | 9/2006 | Koons | ............... | B60D 1/07 |
| | | | | 224/511 |
| 2008/0246011 A1* | 10/2008 | Heravi | ............... | B66D 1/14 |
| | | | | 254/266 |

* cited by examiner

PROTECTION BAR FOR A FRONT OF VEHICLE

CROSS REFERENCE TO RELATED APPLICATIONS

This application claims priority to Chinese Patent Applications No. 201710669019.9 filed on Aug. 7, 2017, which is hereby incorporated by reference herein as if set forth in its entirety.

TECHNICAL FIELD

The present disclosure generally relates to the automotive accessory field, and in particular relate to a protection bar for a front of vehicle.

BACKGROUND

The front of vehicle is usually provided with a protection bar which prevents the front from slight collisions. A traditional protection bar 900 usually includes a frame 91 consisting of several tubes formed integrally and a fender 92 as shown in FIG. 1. When any part of the frame 91 is crushed, it is necessary to replace the whole protection bar 900 to guarantee its performance. Moreover, the protection bar 900 cannot be utilized on different vehicle models since the size, and in particular, the length of the frame 91, is fixed.

DETAILED DESCRIPTION

The disclosure will now be described in detail with reference to the accompanying drawings and examples.

Figure 1:
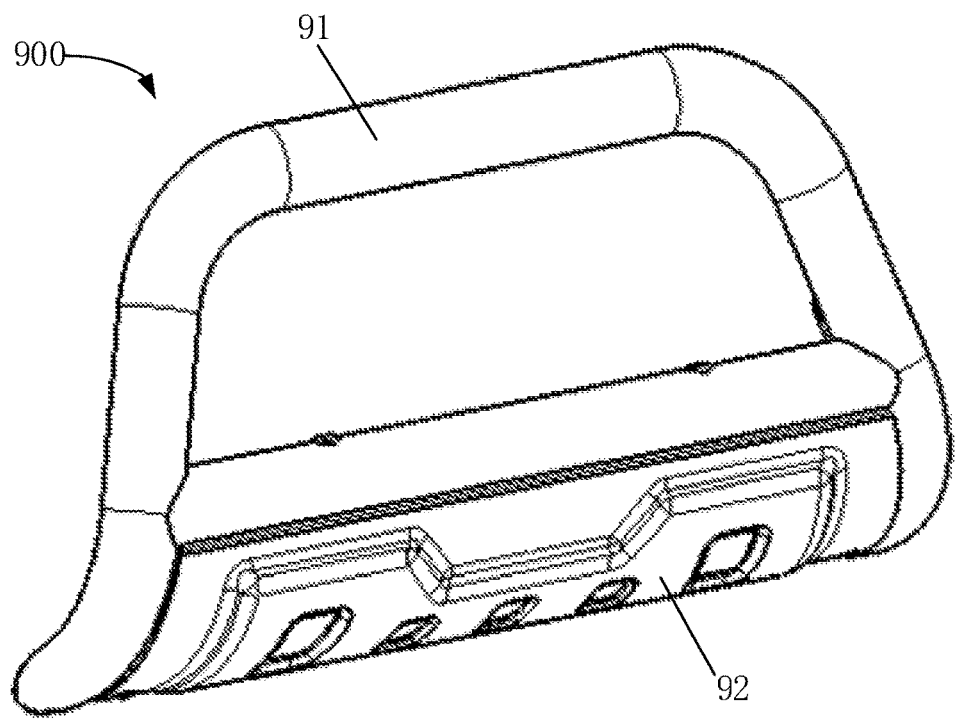
FIG. 1 is a perspective view of a traditional protection bar.
Figure 2:
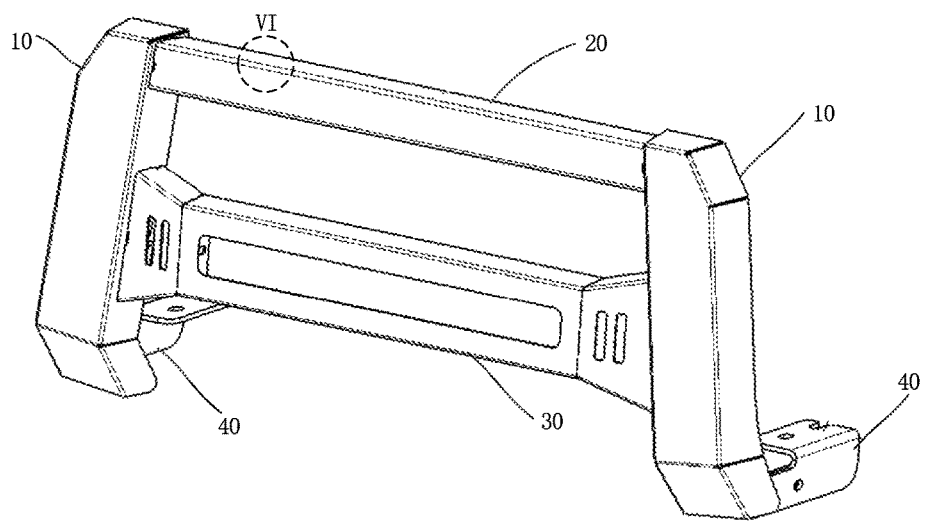
FIG. 2 is a perspective assembled view of a protection bar according to an embodiment of the present disclosure.
Figure 3:
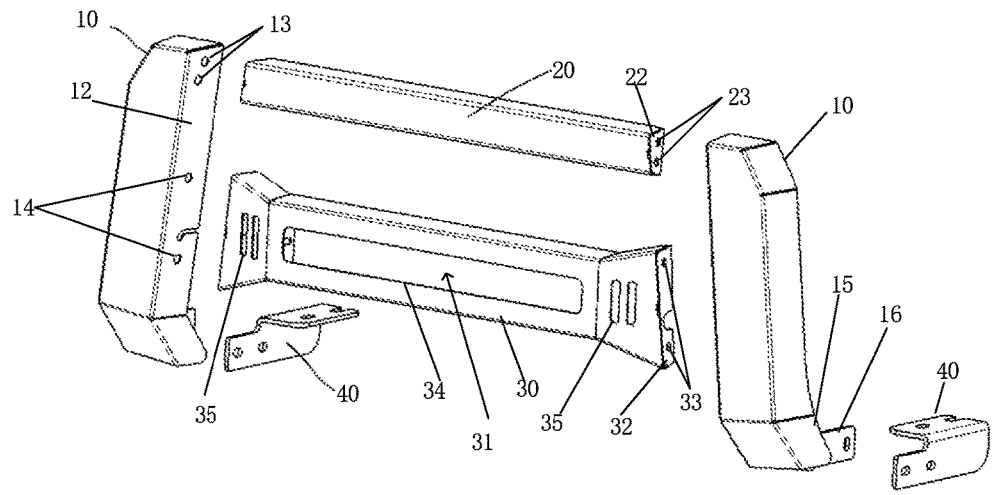
FIG. 3 is an exploded view of the protection bar of FIG. 2.
Figure 4:
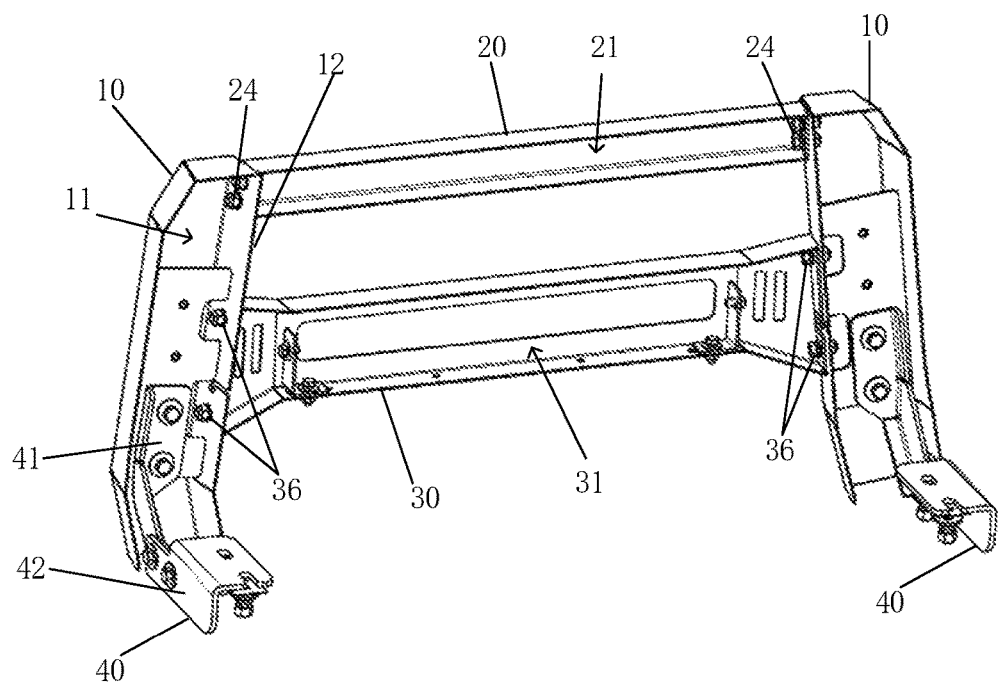
FIG. 4 is the protection bar of FIG. 1, but shown from another side.

Referring to FIGS. 2-4, a protection bar according to an embodiment of the present disclosure is shown. The protection bar may include two vertical portions 10 and a first horizontal portion 20. When the protection bar is assembled on a vehicle, the vertical portions 10 are connected to the front of the vehicle. The connecting positions of the two vertical portions 10 may be adjustable, therefore the distance between the two vertical portions 10 is variable. The first horizontal portion 20 is connected to the two vertical portions 10 and has a first length to fit the distance between the two vertical portions 10. The protection bar may protect the vehicle body from collisions. First connection components 24 may be utilized to connect the first horizontal portion 20 with the vertical portions 10.

In some embodiments, the first horizontal portion 20 may include multiple walls to define a first chamber 21. The sides at the two ends of the first horizontal portion 20 may form first side walls 22 of the first chamber 21. In addition, first holes 23 may be defined at the two ends of the first horizontal portion 20. Second holes 13 may be defined in the vertical portions 10. In this embodiment, each of the first holes 23 may be a through hole defined in the first side wall 22, and the second holes 13 may be threaded holes. Optionally, the first connection component 24 may be a screw extending through the first hole 23 to be engaged in the second hole 13 so as to connect the first horizontal portion 20 with the vertical portions 10.

In other embodiments, the vertical portion 10 may include multiple walls to define a second chamber 11. The walls towards the center of the protection bar may form second side walls 12 of the second chamber 11. In this embodiment, the first holes 23 may be threaded holes defined in the two ends of the first horizontal portion 20 and each of the second holes 13 may be a through hole defined in the second side wall 12. Optionally, the first connection component 24 may be a screw (not shown) extending through the second hole 13 to be engaged in the first hole 23 so as to connect the first horizontal portion 20 with the vertical portions 10.

An advantageous effect of the present disclosure is that the protection bar of the present disclosure may be easily detached by detaching the first connection components 24. For instance, when a component of the protection bar (e.g. the first horizontal portion 20) is damaged due to collisions, it is only necessary to disassemble the protection bar and change the damaged component rather than to change the entire protection bar.

Another advantageous effect of the present disclosure is that the protection bar of the present disclosure may be implemented on different vehicle models with different front sizes. Since the first horizontal portion 20 may be easily detached by detaching the first connection components 24, the first horizontal portion 20 may be replaced by a longer one when the distance between the two vertical portions 10 is longer based on the connecting positions of the vertical portions 10 on the vehicle, or the first horizontal portion 20 may be replaced by a shorter one when the distance between the two vertical portions 10 is smaller based on the connecting positions of the vertical portions 10 on the vehicle.

It is to be understood that the connection between the horizontal portion 20 and the vertical portions 10 may be achieved by other ways. In some embodiments, the horizontal portion 20 and the vertical portions 10 may both include multiple walls to define, respectively, the first chamber 21 and the second chambers 11. Moreover, the first holes 23 and the second holes 13 may both be through holes, and the first connection components 24 may be bolts each extending through the first hole 23 and the second hole 13 and secured by two nuts (not labeled) received respectively in the first chamber 21 and the second chamber 11.

The protection bar of the present disclosure may further include a second horizontal portion 30. Second connection components 36 may be utilized to connect the second horizontal portion 30 with the vertical portions 10, and the second horizontal portion 30 may be assembled on a lower position than that of the first horizontal portion 20. The second horizontal portion 30 may have a second length substantially the same as the first length of the first horizontal portion 20. The second horizontal portion 30 may help protect the vehicle body from collisions.

In some embodiments, the second horizontal portion 30 may include multiple walls to define a third chamber 31. The walls at the two ends of the second horizontal portion 30 may form third side walls 32 of the third chamber 31. In addition, third holes 33 may be defined at the two ends of the second horizontal portion 30. Fourth holes 14 may be defined in the vertical portions 10 at a lower position then the second holes 13. In this embodiment, each of the third holes 33 may be a through hole defined in the third side wall 32, and the fourth holes 14 may be threaded holes. Optionally, the second connection component 36 may be a screw extending through the third hole 33 to be engaged in the fourth hole 14 so as to connect the second horizontal portion 30 with the vertical portions 10.

In other embodiments, when the vertical portion 10 includes multiple walls to define the second chamber 11. As described above, the walls towards the center of the protection bar may form second side walls 12 of the second chamber 11. In this embodiment, the third holes 33 may be threaded holes defined in the two ends of the second horizontal portion 30 and each of the fourth holes 14 may be a through hole defined on the second side wall 12 at a lower position than the second holes 13. Optionally, the second connection component 36 may be a screw extending through the fourth hole 14 to be engaged in the third hole 33 so as to connect the second horizontal portion 30 with the vertical portions 10.

In some embodiments, each of the first horizontal portion 20, the vertical portions 10 and the second horizontal portion 30 may include multiple walls to define, respectively, the first chamber 21, the second chamber 11, and the third chamber 31. Moreover, the first holes 23, the second holes 13, the third holes 33, and the fourth holes 14 may be through holes. The first connection components 24 may be bolts each extending through the first hole 23 and the second hole 13 and secured by two nuts (not labeled) received, respectively, in the first chamber 21 and the second chamber 11, and the second connection components 36 may be bolts each extending through the third hole 33 and the fourth hole 14 and secured by two nuts (not labeled) received, respectively, in the third chamber 31 and the second chamber 11.

In some embodiments, the thickness of the walls mentioned above may have several option values, such as 1 mm, 2 mm, 3 mm, and 5 mm, according to the strength requirement of the protection bar.

Figure 6:
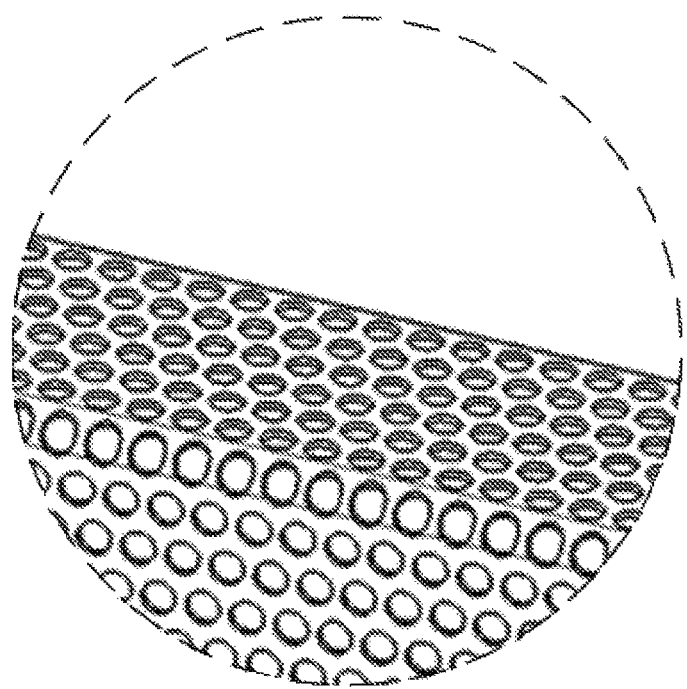
FIG. 6 is an enlarged view of the circle portion VI of FIG. 2.

In some embodiments, the walls of the first horizontal portion 20 and the second horizontal portion 30 may have a multi-orifice configuration as shown in FIG. 6. The multi-orifice configuration may allow outside light to enter. Therefore, it is possible to install a camera or a light sensor in the first chamber 21 or the third chamber 31 as needed.

As shown in FIG. 1-FIG. 4, the protection bar of the present disclosure may further include two connectors 40 each assembled to the vertical portion 10 at the bottom side. The connectors 40 are configured to connect the vertical portion 10 to the front of the vehicle. In some embodiments, the connector 40 may have a vertical part 41 mounted on the vertical portion 10 and a horizontal part 42 extending along a direction substantially perpendicular to that of the first horizontal portion 20 such that a space is provided between the first horizontal portion 20 and the front of the vehicle. Therefore, the impact during a collision absorbed by the first horizontal portion 20 may be isolated from the vehicle body.

The first horizontal portion 20 and the second horizontal portion 30 may provide additional functions. For example, the first chamber 21 and/or the third chamber 31 may be utilized to receive functional components such as a camera, light, or sensors.

Figure 5:
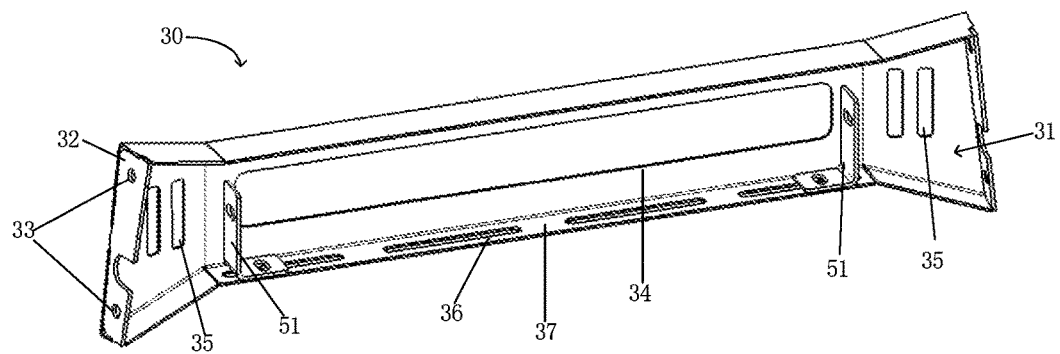
FIG. 5 is a perspective view of a second horizontal portion according to an embodiment of the present disclosure.

Referring to FIG. 5, a second horizontal portion 30 according to an embodiment of the present disclosure is illustrated. The protection bar may include a light assembly received in the third chamber 31, wherein the light assembly comprises two support elements 51 and a light element (not shown). For reason of clarity, the light element is not shown in FIG. 5. The light element may be an elongated light such as an LED. The support elements 51 are assembled at different positions of the bottom wall 37 of the third chamber 31 and connected respectively to the two ends of the light element. A first window 34 is defined on the second horizontal portion 30 and communicated to the third chamber 31 to let pass light of the light element. Therefore, the protection bar of the present disclosure may provide additional light source or light decoration for the vehicle. The first window 34 may be provided with a protection such as metal net or rigid transparent plastics so as to protect the light element inside.

In some embodiments, the bottom wall 37 of the third chamber 31 may define at least one elongated slot 36 and the two support elements 51 are assembled to the bottom wall 37 by two third connection components (not shown), such as bolts each extending through the support element 51 and the elongated slot 36. Therefore, the distance between the support elements 51 may be adjusted by change the assembling position of the support elements 51 in the elongated slot 36.

In some embodiments, the second horizontal portion 30 may further include two second windows 35, each located at a respective lateral side of the first window 34 and communicated to the third chamber 31. The second windows 35 may function as air vents to improve the ventilation in the third chamber 31 to avoid heat buildup due to the light element. Alternatively, the second windows 35 may be utilized just for decoration.

Various aspects of the techniques described herein may be used alone, in combination, or in a variety of arrangements not specifically discussed in the embodiments described in the foregoing description and is therefore not limited in its application to the details and arrangement of components set forth in the foregoing description or illustrated in the drawings.

Use of ordinal terms such as "first," "second," "third," etc., in the specification or the claims to modify an element does not by itself connote any priority, precedence or order of one element over another, but are used merely as labels to distinguish one element having a certain name from another element having a same name to distinguish the mentioned elements.

It is to be understood that the above-mentioned technical features may be used in any combination without limitation. The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A protection bar for a front of a vehicle, comprising:
   two vertical portions for connecting to a front of a vehicle, wherein a distance is defined between the two vertical portions, and the distance is variable according to different positions of the two vertical portions;
   a first horizontal portion comprising a plurality of first walls to define a first chamber, wherein the first horizontal portion is detachably assembled on the two vertical portions by two first connection components each connecting a respective first wall of the first horizontal portion and a corresponding one of the two vertical portions;
   a second horizontal portion having a plurality of second walls to define a second chamber, wherein the second horizontal portion is detachably assembled to the two vertical portions by two second connection components each connecting a respective second wall of the second horizontal portion and a corresponding one of the two vertical portions, wherein the second horizontal portion is located adjacent the first horizontal portion; and a light assembly received in the second chamber, wherein the light assembly comprises:

two support elements assembled at different positions of a bottom wall of the second horizontal portion;

a light element assembled on the support elements; and wherein the second horizontal portion defines a first window to the second chamber to let pass light of the light element.

2. The protection bar of claim 1, wherein each of the vertical portions provides a first threaded hole and a second threaded hole and the second threaded hole is located adjacent the first threaded hole;

each of the first connection components extends through the respective first wall to be engaged in the first threaded hole and each of the second connection components extends through the respective second wall to be engaged in the second threaded hole.

3. The protection bar of claim 1, wherein each of the vertical portions comprises a plurality of third walls defining a third chamber;

each of the first connection components extends through the respective first wall and a third wall of the vertical portion, and is secured by a first nut received in the third chamber; and each of the second connection components extends through the respective second wall and the third wall of the vertical portion, and is secured by a second nut received in the third chamber.

4. The protection bar of claim 1, further comprising two connectors, each detachably assembled to a respective one of the vertical portions on a side opposite to that of the first horizontal portion, wherein the connectors are configured to connect the vertical portions to the front of vehicle.

5. The protection bar of claim 3, wherein the first walls, the second walls, and the third walls have a thickness of 3 mm.

6. The protection bar of claim 1, wherein the bottom wall of the second horizontal portion defines at least one elongated slot;

the two support elements are mounted to the bottom wall by two third connection components each extending through a respective one of the two supports elements and the at least one elongated slot such that the positions where the support elements are assembled are adjustable to fit a length of the light element.

7. The protection bar of claim 1, wherein the second horizontal portion further comprises two second windows to the second chamber each located at a respective lateral side of the first window.

8. The protection bar of claim 1, wherein the first walls and the second walls have a multi-orifice configuration.

9. A protection bar configured to fit a distance between two connecting positions on a front of a vehicle, comprising:

two vertical portions each comprising a plurality of first walls defining an installation chamber, wherein the two vertical portions are respectively for connecting to two connecting positions on a front of a vehicle;

a first replaceable horizontal portion assembled to the two vertical portions, having a first length corresponding to a distance between the two connecting positions, wherein the first replaceable horizontal portion is detachably assembled to the vertical portions by two first connection components each connecting an inner side wall of a respective one of the vertical portions and a corresponding end of the first replaceable horizontal portion;

a second replaceable horizontal portion;

wherein a second length of the second replaceable horizontal portion is substantially the same as the first length of the first replaceable horizontal portion;

wherein the second replaceable horizontal portion is detachably assembled to the vertical portions by two second connection components each connecting the inner side wall of the respective one of the vertical portions and a corresponding end of the second replaceable horizontal portion, wherein the second replaceable horizontal portion is located adjacent the first replaceable horizontal portion;

wherein the second replaceable horizontal portion comprises a plurality of third walls to define a second chamber;

wherein each of the second connection components extends through a respective third wall of the second replaceable horizontal portion and the inner side wall of the respective one of the vertical portions, and is secured by a second nut received in the second chamber;

wherein the protection bar further comprises a light assembly received in the second chamber, the light assembly comprising a light element and two support elements connected to two ends of the light element to assemble the light element on different positions of a bottom wall of the second replaceable horizontal portion based on a length of the light element; and wherein the second replaceable horizontal portion defines a first window to the second chamber to let pass light of the light element and two second windows to the second chamber each located at a respective lateral side of the first window.

10. The protection bar of claim 9, wherein the corresponding end of the first replaceable horizontal portion provides a first threaded hole; and each of the first connection components extends through the inner side wall of the respective one of the vertical portions to be engaged in the first threaded hole of the corresponding end of the first replaceable horizontal portion.

11. The protection bar of claim 9, wherein the first replaceable horizontal portion comprises a plurality of second walls to define a first chamber;

each of the first connection components extends through a respective second wall of the first replaceable horizontal portion and the inner side wall of the respective one of the vertical portions, and is secured by a first nut received in the first chamber.

12. The protection bar of claim 11, wherein the first walls and the second walls have a thickness of 3 mm and the second walls have a multi-orifice configuration.

13. The protection bar of claim 9, wherein the corresponding end of the second replaceable horizontal portion provides a second threaded hole; and each of the second connection components extends through the inner side wall of the respective one of the vertical portions to be engaged in the second threaded hole of the corresponding end of the second replaceable horizontal portion.

14. The protection bar of claim 9, wherein the first walls and the third walls have a thickness of 3 mm and the third walls have a multi-orifice configuration.

15. The protection bar of claim 9, further comprising two connectors each detachably assembled to the respective one of the vertical portions on a side opposite to that of the first horizontal portion, wherein the connectors are configured to connect to the vertical portions on the two connecting positions on the front of the vehicle.

\* \* \* \* \*